United States Patent
Hogan et al.

(10) Patent No.: US 7,181,212 B2
(45) Date of Patent: Feb. 20, 2007

(54) METHOD AND APPARATUS FOR LOCATION AREA UPDATING IN CELLULAR COMMUNICATIONS

(75) Inventors: William Damian Hogan, Dublin (IE); Nils Peter Ostrup, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 915 days.

(21) Appl. No.: 09/933,133

(22) Filed: Aug. 21, 2001

(65) Prior Publication Data
US 2003/0040313 A1    Feb. 27, 2003

(51) Int. Cl.
*H04Q 7/20* (2006.01)

(52) U.S. Cl. .................... 455/434; 455/436; 455/456.1

(58) Field of Classification Search ................ 455/435, 455/436, 434, 551, 566, 432, 419, 420, 421
See application file for complete search history.

(56) References Cited

U.S. PATENT DOCUMENTS

| | | | | |
|---|---|---|---|---|
| 4,916,728 A * | 4/1990 | Blair | .......................... | 455/455 |
| 5,784,693 A | 7/1998 | Barber et al. | | |
| 5,787,347 A * | 7/1998 | Yu et al. | ..................... | 455/440 |
| 5,983,115 A | 11/1999 | Mizikovsky | | |
| 6,032,042 A | 2/2000 | Kauppi | | |
| 6,148,197 A * | 11/2000 | Bridges et al. | .......... | 455/432.3 |
| 6,212,390 B1 * | 4/2001 | Rune | ........................ | 455/456.6 |
| 6,516,193 B1 * | 2/2003 | Salmela et al. | .......... | 455/432.3 |
| 7,003,299 B2 * | 2/2006 | Amin | ......................... | 455/445 |
| 2002/0111166 A1 * | 8/2002 | Monroe | ....................... | 455/435 |

FOREIGN PATENT DOCUMENTS

| | | | |
|---|---|---|---|
| WO | 95/07010 A | | 3/1995 |
| WO | WO 95/07010 | * | 3/1995 |

* cited by examiner

Primary Examiner—Fan Tsang
Assistant Examiner—Olisa Anwah
(74) Attorney, Agent, or Firm—Nixon & Vanderhye P.C.

(57) ABSTRACT

A radio access network provides information to a mobile radio terminal indicating a list of one or more geographic coverage areas from which the mobile radio terminal may or may not obtain service. In the preferred example embodiment, a "forbidden" list includes one or more geographic coverage areas from which the mobile radio terminal may not obtain service. The mobile checks the received information when considering whether to request service from a new geographic coverage area, and determines whether to select the geographic coverage area depending on that received information. Moreover, the mobile terminal consults that list to determine whether to perform a location area update procedure. In other words, if the list indicates that a new geographic coverage area should not be selected, the mobile terminal does not perform a location area update request in that new coverage area.

34 Claims, 10 Drawing Sheets

Successful LA Update with new forbidden list.

Fig. 10 Successful LA Update with forbidden list already received

Unsccessful LA Update with new forbidden list received.

Unsuccessful LA Update with new forbidden list received.

Location Updating Accept (LUA) Message

Location Updating Reject (LURej) Message

Location Updating Request (LUReq) Message

METHOD AND APPARATUS FOR LOCATION AREA UPDATING IN CELLULAR COMMUNICATIONS

FIELD OF THE INVENTION

The present invention relates generally to location area updating in cellular radio telecommunications, and in one particular application, to location area updating in situations where a radio access network is shared by two or more operators.

BACKGROUND AND SUMMARY

In a typical cellular radio system, "wireless" user equipment units (UEs) and one or more "core" networks (like the public telephone network or Internet) communicate via a radio access network (RAN). The UEs very often are mobile, e.g., cellular telephones and laptops with mobile radio communication capabilities (mobile terminals). UEs and the core networks communicate both voice and data information via the radio access network.

The radio access network services a geographical area which is divided into cell areas, with each cell area being served by a base station (BS). Thus, a base station can serve one or multiple cells. A cell is a geographical area where radio coverage is provided by the radio base station equipment at a base station site. Each cell is identified by a unique identity, which is broadcast in the cell. Base stations communicate over a radio or "air" interface with the user equipment units. In the radio access network, base stations are typically connected, (e.g., by landlines or microwave links), to a radio network controller (RNC). The radio network controller, also sometimes termed a base station controller (BSC), supervises and coordinates various activities of its base stations. In turn, the radio network controllers are typically coupled together and coupled to one or more core network service nodes which interface with one or more core networks.

One example of a radio access network is the Universal Mobile Telecommnunications System (UMTS) Terrestrial Radio Access Network (UTRAN). The UTRAN is a third generation system which in some respects builds upon the radio access technology known as Global System for Mobile communications (GSM) developed in Europe. UTRAN is a wideband code division multiple access (W-CDMA) system.

In W-CDMA technology, a common frequency band allows simultaneous communication between a user equipment unit and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units. Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit need not switch frequency when handoff of a connection is made from one cell to another. As a result, a destination cell can support a connection to a user equipment unit at the same time the origination cell continues to service the connection. Since the user equipment is always communicating through at least one cell during handover, there is no disruption to the call. Hence, the term "soft handover." In contrast to hard handover, soft handover is a "make-before-break" switching operation.

The UTRAN accommodates both circuit-switched and packet-switched connections. Circuit-switched connections involve a radio network controller communicating with a mobile switching center (MSC) node which in turn is connected to a connection-oriented, external core network like the Public Switched Telephone Network (PSTN) and/or the Integrated Services Digital Network (ISDN). Packet-switched connections involve the radio network controller communicating with a Serving GPRS Support Node (SGSN), which in turn is connected through a backbone network and a Gateway GPRS support node (GGSN) to packet-switched core networks like the Internet and X.25 external networks. There are several interfaces of interest in the UTRAN. The interface between the radio network controllers and the core network(s) is termed the "Iu" interface. The interface between two radio network controllers is termed the "Iur" interface. The interface between a radio network controller and its base stations (or node B's) is termed the "Iub" interface. The interface between the user equipment unit and the base stations is known as the "air interface" or the "radio interface."

Mobility features of a mobile radio communications system can be divided into two areas: radio mobility, which mainly consists of handover, and network mobility, which mainly consists of location management including location updating and paging. The present invention relates to network mobility. There is a tension in the network mobility process between location and paging procedures. The location procedure allows the system to monitor a user equipment's location in order to be able to find that user in case of an incoming call. Location registration is also used to bring the user's service profile near its location and allows the network to provide the services for which the user has subscribed. The paging process sends paging messages to cells where the mobile terminal could be located. Therefore, if the location cost is high, meaning that the user's location knowledge is accurate, the paging cost will be low, and paging messages need only be transmitted to a small number of cells. On the other hand, if the location cost is low, the paging cost will be high, and paging messages will have to be transmitted over a wider area.

Cellular networks often make use of location areas (LAs). FIG. 1 illustrates two location areas LA1 and LA2. LA1 encompasses representative cells C1–C7, and location area LA2 encompasses representative cells C8–C14. A user equipment's location is "known," if the system knows the location area in which the subscriber is presently located. When the system must establish a communication with the mobile terminal, paging need only occur in the cells of that location area. Although mobile terminals can periodically update their locations with the network, more often location updates are provided when the mobile terminal crosses a location area boundary. This method requires that each base station cell periodically broadcast its identity and the identity of its location area. Each mobile terminal listens to the broadcast information on a cell's broadcast channel and stores the current location area identity. If the received location area identity differs from the one stored by the mobile radio, a location update procedure is triggered by the mobile. However, a problem with location area procedures is the associated signaling overhead.

Location area signaling overhead is particularly problematic in shared network situations. A shared network is a radio access network infrastructure shared by two or more cellular operators, typically to reduce the cost of network buildout and maintenance. FIG. 2 illustrates an example shared network 1 and includes a core network with one or more core network nodes 2 coupled to a radio access network (RAN) 4 which provides radio access service to a geographic coverage area 6. The core network typically has some responsibilities in handling mobile terminal registrations, location area monitoring and updates, and paging.

The geographic coverage area 6 is divided into several representative location areas (LAs), some of which are "owned" or operated by operator A, and some of which are owned or operated by operator B. For example, location area LA-A1 belongs exclusively to operator A, and location area LA-B1 belongs exclusively to operator B. In contrast, location areas LA-A2, owned by operator 2, and LA-B2, owned by operator B, overlap in coverage area.

The responsibilities and tasks for establishing connections to/from a mobile terminal are often divided between the core network 2 and the radio access network 4. For example, in a UMTS network, these tasks are divided between a logical non-access stratum (NAS) and a logical access stratum (AS). NAS signaling does not require substantive inputs from the RAN, while AS signaling does. The non-access stratum is responsible for mobility management for idle mobile terminals on a location area level and on a routing area level. The access stratum is responsible for mobility management for connected mobile terminals on a routing area and cell level. An idle mobile terminal is "on," registered, and accessible, but is not currently involved in or using a radio connection supported by the RAN. A connected mobile terminal is currently involved in or using a radio connection supported by the RAN. Being "connected," the radio network knows the location of the mobile terminal on a cell or UTRAN Registration Area (URA) level, and the core network knows that the mobile terminal is connected.

This allocation of responsibility and tasks between NAS (i.e., core network) and AS (i.e., RAN) does not satisfactorily address situations where the radio access network 4 is shared by two competing (or cooperating) operators, such as the operators A and B shown in FIG. 2. When a mobile terminal in a connected mode is leaving a location area to a cell in a new location area, the mobile terminal may not be allowed to enter the new location area if it is configured for/owned by a competing (or cooperating) operator. A solution to this problem is for the mobile terminal to perform a location area update that involves the core network in such a situation. Upon receiving the location area update from the mobile terminal, the core network detects the identification number of the mobile terminal, e.g., its IMSI number, and checks a database maintained by the core network to determine if the mobile terminal is permitted in the new location area. If it is not permitted, the core network rejects the location update, and the mobile terminal looks for an alternative cell. As shown in the geographic coverage area 6 of FIG. 2, the mobile terminal belongs to operator B and is leaving location LA-B1 into a coverage area shared by operators A and B. Even if the mobile is connected (rather than idle), a location update should be performed so that if the mobile terminal selects a cell in location area LA-A2, the core network will reject that request. As a result, the mobile terminal will have to reselect another cell, hopefully an overlapping cell in location area LA-B2.

The difficulty with this comprehensive location area update approach for idle and connected mobiles is that it adds substantial location area registration signaling load/ overhead, and in particular, when the network is not shared between different operators. There may not be a need for the core network to know the exact location of a mobile terminal while it is in a connected mode, except for certain circumstances, e.g., the network is being shared by two or more operators. In other words, there may be some situations, such as a shared location area, when the mobile should perform a location area update with the core network. There may be other situations, in shared network and other contexts, where there is no need for a location area update. The present invention resolves the problem of unnecessary location area updates for both idle mode and connected mode mobile radio terminals.

More specifically, the radio access network provides information to a mobile radio terminal indicating a list of one or more geographic coverage areas from which the mobile radio terminal may or may not obtain service. In the preferred example embodiment, a "forbidden" list includes one or more geographic coverage areas from which the mobile radio terminal may not obtain service. The mobile checks the received information when considering whether to request service from a new geographic coverage area, and deternunes whether to select the geographic coverage area depending on that received information. Moreover, the mobile terminal consults that list to determine whether to perform a location area update procedure. In other words, if the list indicates that a new geographic coverage area should not be selected, the mobile terminal does not perform a location area update request for that new coverage area.

From the perspective of the radio access network, the network receives a message from a mobile radio terminal, and in response to that message, sends information indicating a list of geographic coverage areas from which the mobile radio may or may not request service. In a preferred example embodiment, one of those messages may be a first location area update request message sent by the mobile terminal after being powered on. The radio access network in an example, non-limiting embodiment is shared by first and second operators. The information indicates one or more geographic coverage areas belonging to one of the operators that does not provide service to the mobile radio terminal.

The core network, coupled to the radio access network, formulates determines one or more groups of mobile terminals, and generates a list of location areas corresponding to each of the groups. In response to the message received from the mobile terminal, information associated with one of the lists of the location areas is forwarded to the mobile terminal depending upon the group to which the mobile terminal belongs. For example, each group may represent mobile terminals belonging to a network operator, to a mobile subscriber group, etc. More specifically, in receiving the mobile terminal message, the core network may determine the mobile terminal identifier, and analyze the mobile terminal identifier to determine the group to which the mobile terminal belongs. Two or more core networks may coordinate in generating the list.

In a UTRAN example embodiment, the geographic area may be a location area, and the information may be received in a LOCATION AREA UPDATE ACCEPT message in response to the mobile terminal sending to the radio access network a LOCATION AREA UPDATE REQUEST message. Alternatively, that information may be received in a LOCATION AREA UPDATE REJECTION message in response to the mobile's LOCATION AREA UPDATE REQUEST message.

One aspect of the present invention is a location updating message format used by the radio network to provide the geographic coverage area list information to the mobile radio terminal. The location updating message format includes a location updating message type field, a location area identification field, a mobile terminal identification field, and a location area field indicating location areas that the mobile terminal may or may not select. In a preferred example embodiment, the location area field includes a location area forbidden list. This message format may be employed by a LOCATION UPDATING ACCEPT message and/or a LOCATION UPDATING REJECT message. The invention also provides for a location updating request message transmitted from a mobile radio terminal to a radio access network that includes a location updating message type field, a mobile terminal identification field, and a location area list indicator field indicating whether a location area list associated with the mobile terminal is requested to be sent to the mobile terminal.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in an example application to shared networks, the present invention may be employed in any application where location area access restrictions are desired or appropriate.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 2:
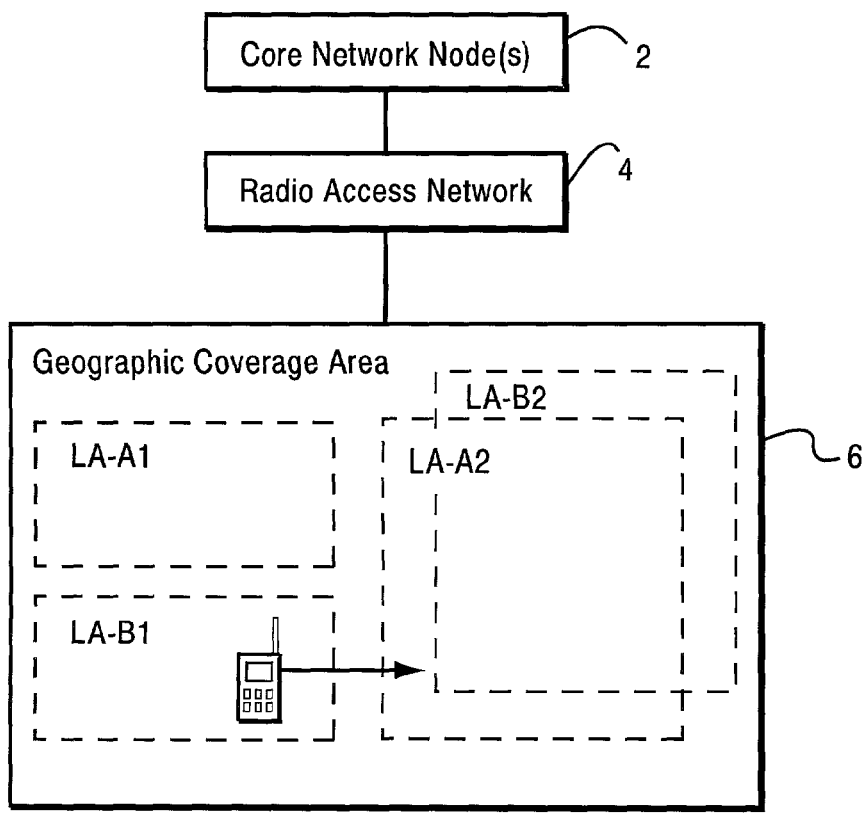
FIG. 2 illustrates a cellular radio communications system in which two operators share some geographic coverage areas.

The present invention may be employed in any cellular communications system including for example that shown in FIG. 2 as well as the UMTS system shown in FIG. 6 and described below. A general objective of the present invention is to provide location area update procedures for mobile terminals where appropriate while at the same time minimizing the amount of location area update signaling required. One non-limiting, example situation where such procedures may be necessary is in a shared network. In this regard, reference is made to the location area update procedure illustrated in flowchart form in FIG. 3. A decision is made in step S1 whether the mobile terminal user equipment is in a shared network situation. If not, the user equipment and the cellular system carry on normal location area update and cell selection procedures as shown in step S2. However, in a shared network situation, signaling is performed with the UE to provide location area access restriction information with minimum signaling overhead in order to reduce or eliminate unnecessary involvement of the core network in location area update and/or cell selection procedures.

Figure 3:
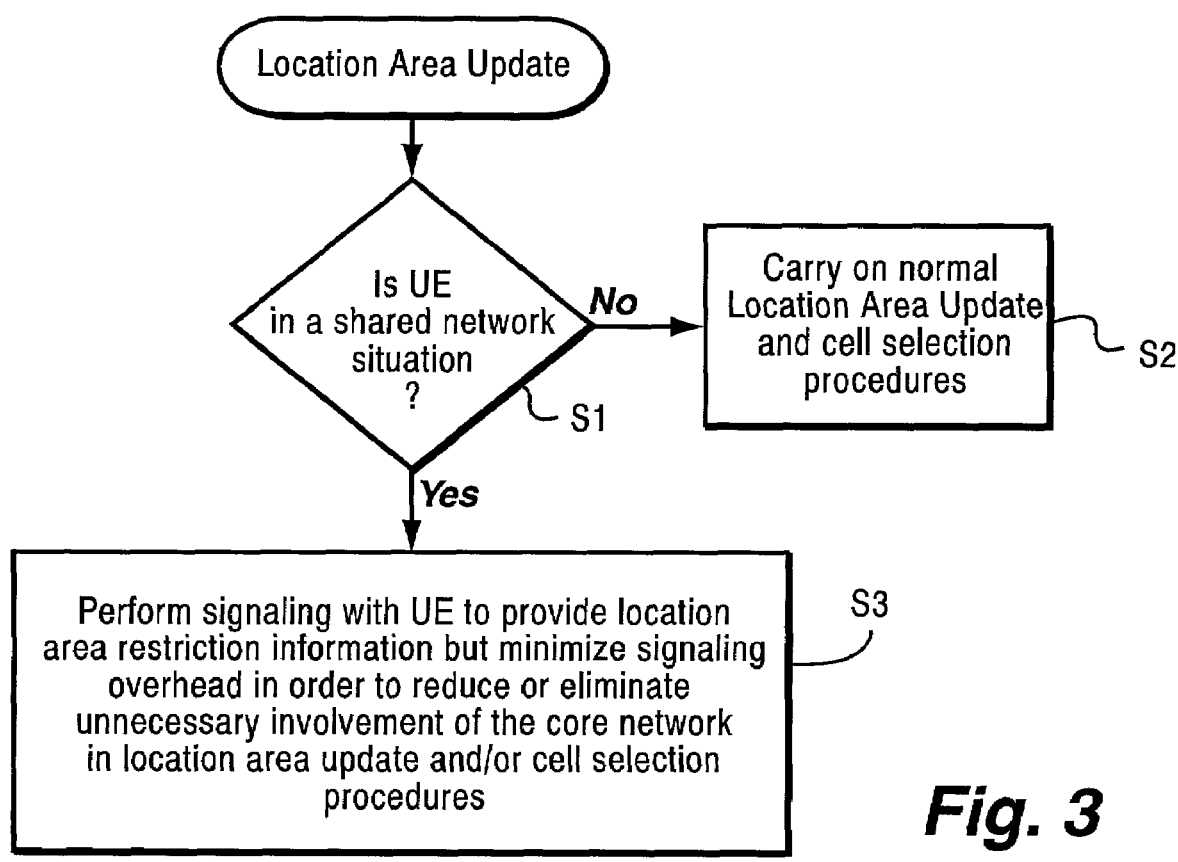
FIG. 3 shows a location area update procedure in flowchart form.
Figure 4:
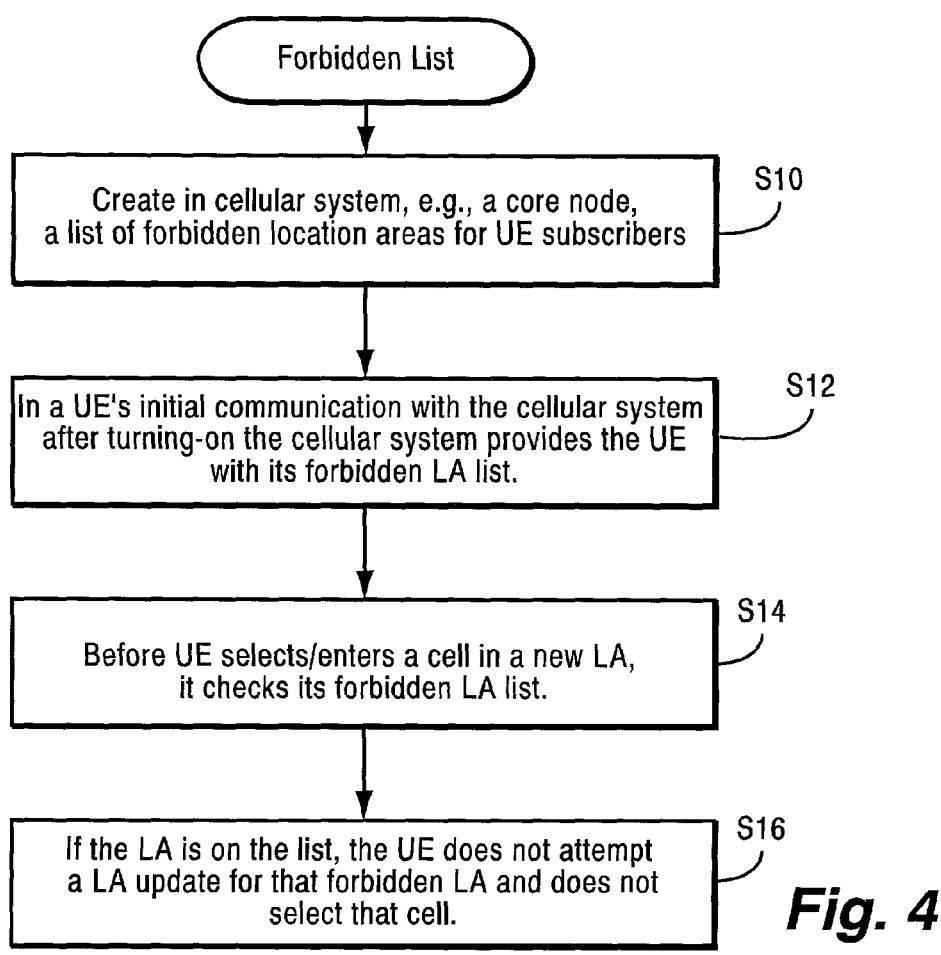
FIG. 4 illustrates a forbidden list procedure in flowchart form.

The present invention provides a forbidden list procedure shown in flowchart form in FIG. 4 for use in implementing the functionality set forth in FIG. 3. It should be recognized that while the present invention is described in the context of a forbidden list of location areas, the present invention could also be implemented using a permitted list of location areas. The cellular system, e.g., a core network node, creates a list of forbidden location areas for various mobile user equipment terminal subscribers in step S10. The location area list may be associated with a mobile identifier, e.g., an IMSI, for each mobile terminal When the mobile terminal communicates with the cellular system, and preferably, in an initial communication after turning "on," such as a first location update request, the cellular system provides the mobile terminal with its associated forbidden location area list in step S12. The mobile terminal stores that list, and before it selects or enters a cell in a new location area, it checks its forbidden location area list in step S14. If the location area of the new call is on the forbidden list, the mobile terminal does not attempt a location area update for that forbidden location area. Nor does the mobile terminal select that new call (step S12).

Figure 5:
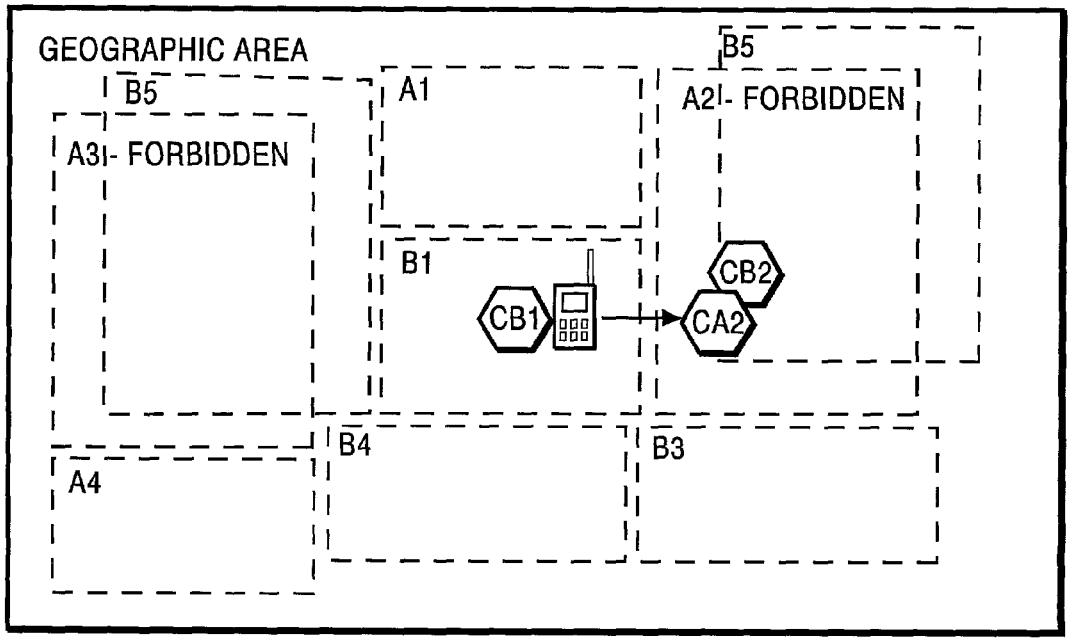
FIG. 5 illustrates a mobile terminal leaving a cell in an unshared location area to a cell in a shared location area.

Referring to an example overall geographical area shown in FIG. 5, (similar to that shown in FIG. 2 with additional location areas), a mobile radio terminal, either in connected or idle mode, is shown moving out of operator B's location area B1, an area which is not shared with operator A, and into a shared location area. The mobile radio terminal receives information broadcast from cell CA2 in A's shared location area A2. As soon as the mobile terminal identifies this new cell as belonging to location area A2, it checks its forbidden location area list received from the network, and determines that location area A2 is forbidden. As a result, the mobile terminal does not select or enter the new cell in location area A2. Nor does it perform a location update procedure relating to this new cell in location area A2.

Since operator B has an overlapping location area B2, the mobile terminal will likely also receive system information broadcast from cell CB2. It then detects that this cell is in location area B2, determines that location area B2 is not on its forbidden location area list, and begins procedures to select cell CB2 (if such a selection is appropriate taking into account other factors). Even if the cell is permitted and then selected by the mobile terminal, there may be circumstances where the mobile terminal need not even perform a location area update, e.g., the mobile terminal is in a connected mode. If the mobile terminal is in idle mode, the mobile terminal will most likely perform the location update procedure to let the cellular system know of its current location area in case it needs to be paged.

Thus, the present invention permits the cellular system to deliver a current forbidden location area list as soon as the mobile terminal makes contact with the cellular system after powering up or sometime thereafter. A subsequent message may also be sent to provide an updated list or an update to the list if the forbidden location area list has changed. The forbidden list could be updated using a special update message if desired. As mentioned above, using the forbidden list eliminates the need for location update signaling for mobiles in a connected mode. It also reduces location update signaling for mobile terminals in an idle mode because the mobile terminal does not have to make a location area update simply to find out if that location area is forbidden.

If the forbidden list is extensive and would add an undesirable signaling load to the network, a reduced or a coded list, or some type of abbreviated list indicator, may be transmitted instead. For example, if a location area ID includes a mobile country code, a mobile network code, and a location area code, it may be possible to only send a list of location area codes as many location areas will likely have the same mobile country code and a mobile network code. One example way to implement the reduced list option would be for the core network to generate a smaller or abbreviated forbidden list that is connected both to a mobile terminal IMSI series as well as to a specific location area. Only a list of those forbidden location areas that are nearby that specific location area are sent to the mobile terminal. Other criteria could be used. Of course, it may be desired to send a list of allowed location areas, especially if that list is smaller than the forbidden list.

The present invention is particularly advantageous in shared network situations where it may be desirable to restrict certain mobile terminals to one or more network operator's location areas, but without the need to implement such restrictions with excessive location area restriction signaling.

Figure 6:
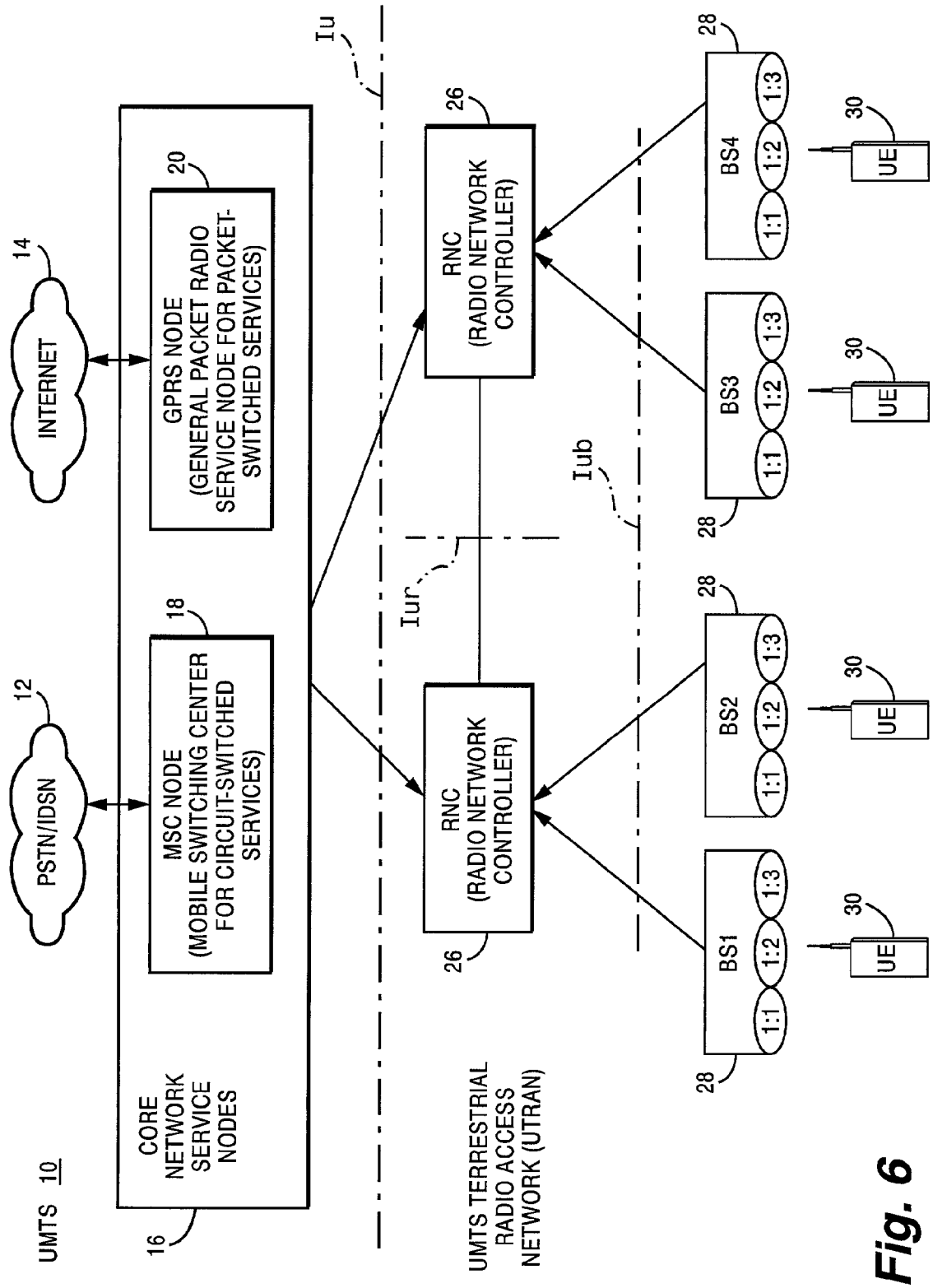
FIG. 6 illustrates a Universal Mobile Telecommunications System (UMTS) in which the present application may be advantageously employed.

The present invention is further described in application to another non-limiting, example context of a Universal Mobile Telecommunications System (UMTS) 10 shown in FIG. 6. A representative, connection-oriented, external core network, shown as a cloud 12 may be, for example, the Public Switched Telephone Network (PSTN) and/or the Integrated Services Digital Network (ISDN). A representative, connectionless-oriented external core network shown as a cloud 14, may be for example the Internet. Both core networks are coupled to corresponding core network service nodes 16. The PSTN/ISDN network 12 is connected to a connection-oriented service node shown as a Mobile Switching Center (MSC) node 1 that provides circuit-switched services. The Internet network 14 is connected to a General Packet Radio Service (GPRS) node 20 tailored to provide packet-switched type services which is sometimes referred to as the serving GPRS service node (SGSN).

Figure 1:
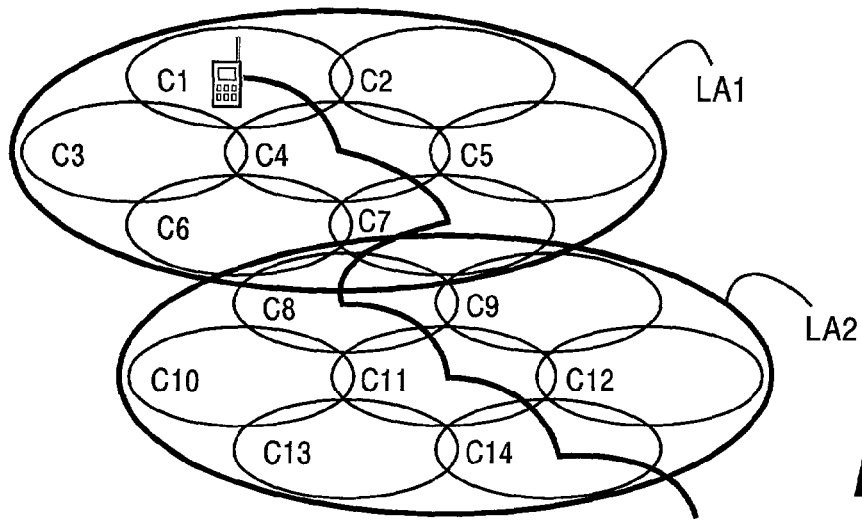
FIG. 1 is an illustration of a mobile radio terminal moving between cells in two different location areas.

Each of the core network service nodes 18 and 20 communicate with a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 6 is shown with only two RNC nodes. Each RNC 26 communicates with a plurality of base stations (BS) 28 BS1–BS4 over the Iub interfaces sometimes referred to as node B's. For example, and again for sake of simplicity, two base station nodes are shown connected to each RNC 26. It will be appreciated that a different number of base stations can be served by each RNC, and that RNCs need not serve the same number of base stations. Moreover, FIG. 6 shows that an RNC can be communicated over an Iur interface to one or more RNCs in the UTRAN 24. A user equipment unit (UE), such as a user equipment unit (UE) 30 shown in FIG. 6, communicates with one or more base stations (BS) 28 over a radio or air interface 32. Each of the radio interface 32, the Iu interface, the Iub interface, and the Iur interface are shown by dash-dotted lines in FIG. 1.

Preferably, radio access is based upon Wideband Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment as well as for the user equipment to identify transmissions from the base station intended for that user equipment from all of the other transmissions and noise present in the same area.

Figure 7:
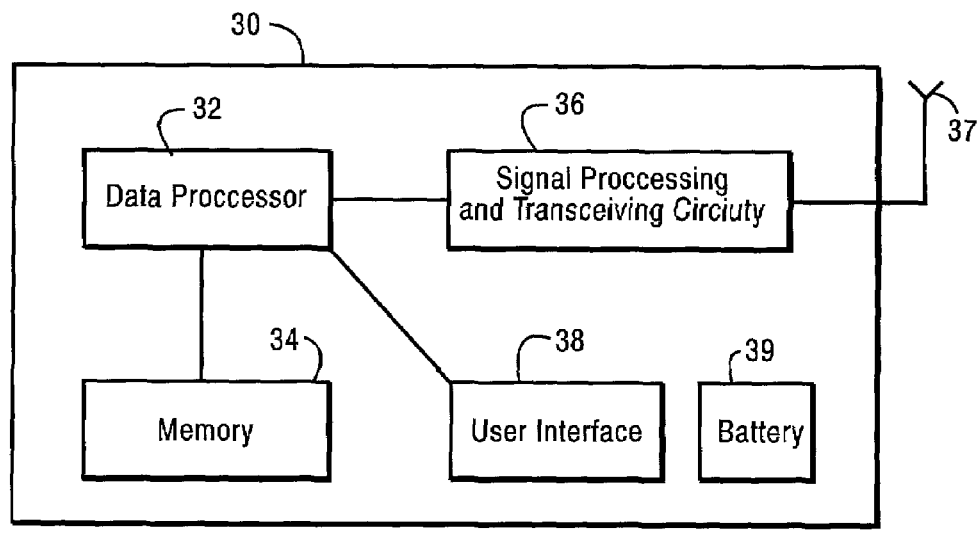
FIGS. 7 and 8 are simplified function block diagrams of the user equipment node, radio network controller node, and base station/node B shown in FIG. 5.

FIG. 7 shows a simplified function block diagram of mobile radio user equipment terminal 30. A data processor 32 is coupled to a memory 34 which stores data and software program information, and to signal processing and transceiving circuitry 36 coupled to an antenna 37. The data processor 32 is also coupled to user interface hardware such as, for example, a keypad, a display, a microphone, a speaker, etc. Power for the various blocks in the radio UE terminal 30 is provided by a battery 39. The signal processing and transceiving circuitry 36 converts information from the data processor, including messages such as location area update messages, into an appropriate format for transmission over the radio interface to the UTRAN via antenna 37 using an appropriate CDMA spreading code/radio channel. Information received over the radio interface, including, e.g., location area updating request resources sent by the UTRAN, is demodulated and decoded by the signal processing and transceiving circuitry 36 for data processing by the data processor 32. For example, the data processor 32 receives a demodulated and decoded system information broadcast message and determines the value of a location area access restriction indicator.

Figure 8:
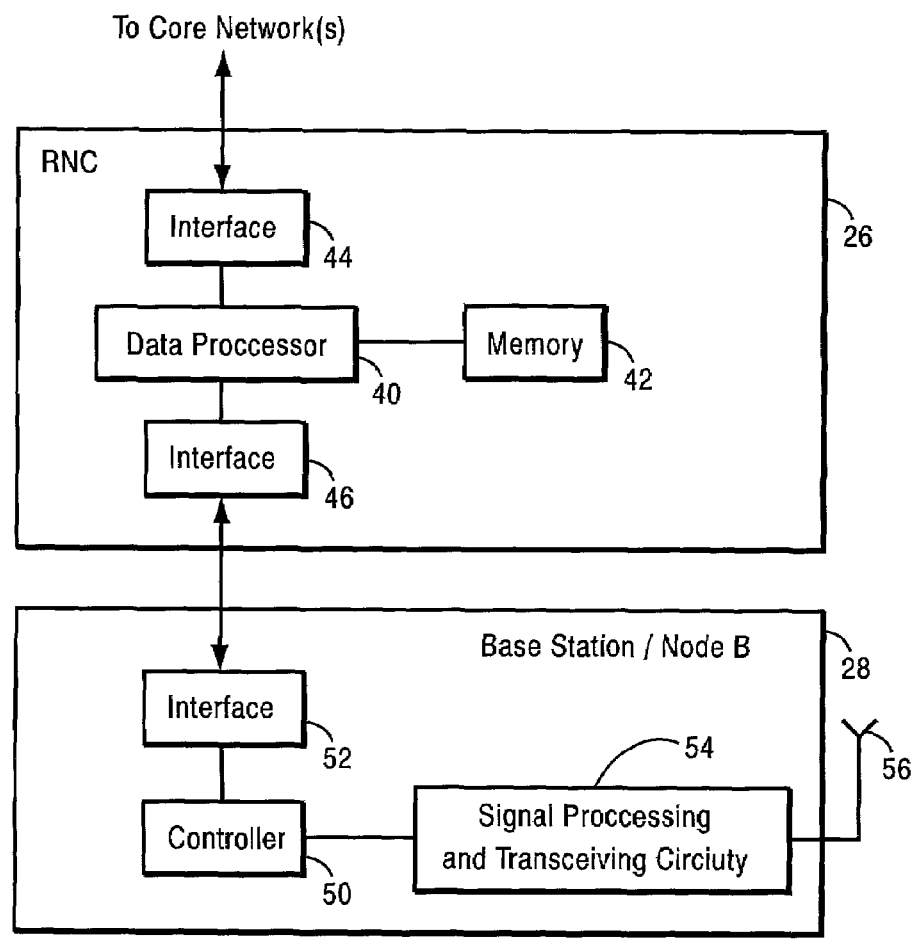

FIG. 8 illustrates simplified function block diagrams of radio network controller 26 and a base station/node B 28. The RNC 26 includes a data processor 40 coupled to memory 42 storing data and program software. The data processor is also coupled to a core network interface 44 as well as to an interface 46 to the base station/node B 28. The RNC 26 formulates location area updating messages that are transmitted by the base station/node B 28, which in the preferred example embodiment and explained in further detail below includes a location area identifier and an access restriction indicator for that location area. Base station 28 includes a controller 50 which may also include data processing and memory circuitry coupled to RNC interface 52 and appropriate signal processing and receiving circuitry 54 coupled to an antenna 56. The signal processing and transceiving circuitry for a base station/node B, similar in many respects to that for the UE, is more extensive.

Figure 9:
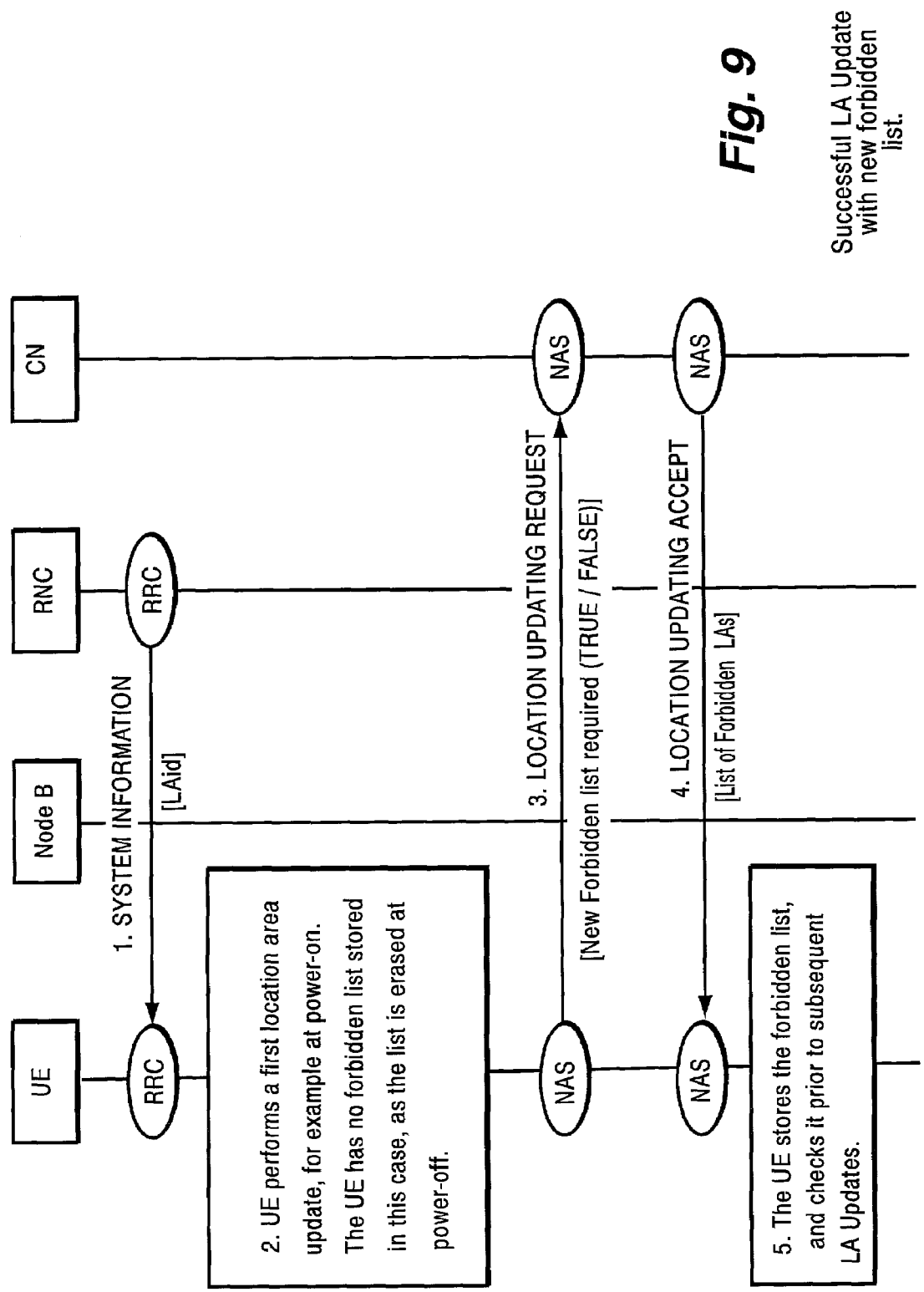
FIGS. 9 and 10 are diagrams illustrating example signaling for a successful location area update with a new forbidden list being either provided or not provided to the mobile terminal.

Reference is now made to the example, non-limiting signaling diagrams shown in FIGS. 9–12. FIG. 9 shows a signaling sequence location area update incorporating an example, non-limiting embodiment of the present invention. Initially, the mobile UE terminal first reads the system information message broadcast from the RNC which includes an identification of the location area in which the current cell is located. Rather than building up a forbidden list one location area access attempt at a time, each time the mobile terminal attempts to perform a location area update in a given location area, the present invention sends the mobile terminal the forbidden list at the first location update, for example, at power-on. Of course, the list maybe sent at other times and in response to other messages. When the mobile terminal first powers on, any previously-stored forbidden list will probably be erased. In any event, in order to obtain the current forbidden list associated with that mobile terminal, the mobile terminal sends a location updating request message which includes a "forbidden list required indicator" bit that is set to true or "1" if the mobile terminal needs a new forbidden list. In this case, the core network accepts the location area update request message and sends a location updating accept message to the mobile terminal, which includes the list of forbidden location areas for that mobile terminal. The mobile terminal stores the list of forbidden location areas and checks this list prior to attempting any further location area updates. In particular, the mobile terminal does not attempt a location area update in any of the forbidden location areas on its list.

Figure 10:
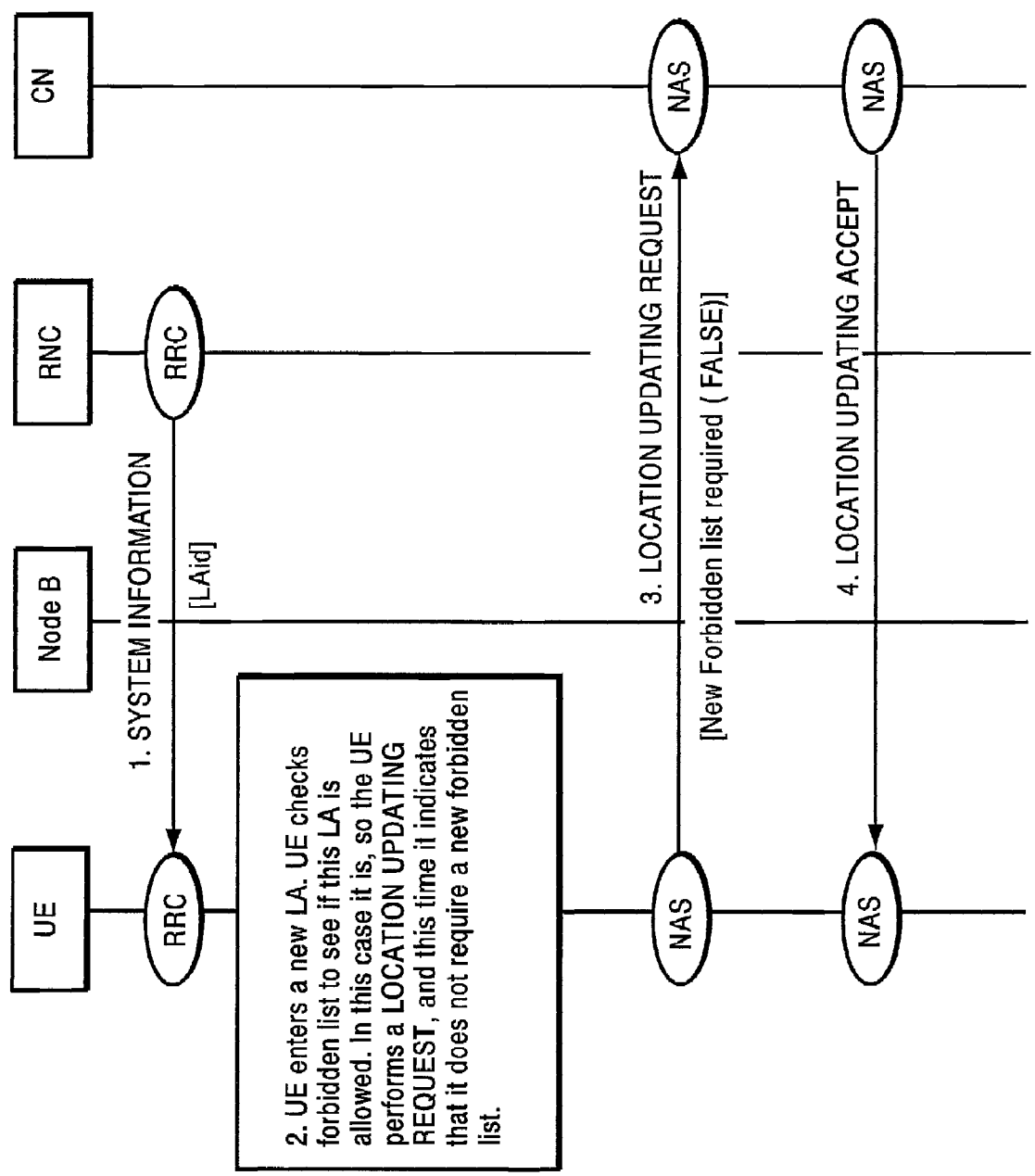

FIG. 10 illustrates subsequent location area updates performed by the mobile terminal after it has initially received a current forbidden list. Again, when the mobile terminal performs a cell selection, it reads the system information. When the UE enters a new location area, it checks its forbidden list to see if this location area is allowed. In this case, it is, and the mobile terminal makes a location updating request (assuming that the mobile terminal is in idle mode). Since the mobile terminal does not need a new forbidden list, it sets the forbidden list required bit to false or "0" in the location updating request message. In this case, the core network accepts the location area update and returns a location updating accept message which does not include a list of forbidden location areas for that mobile terminal.

Figure 11:
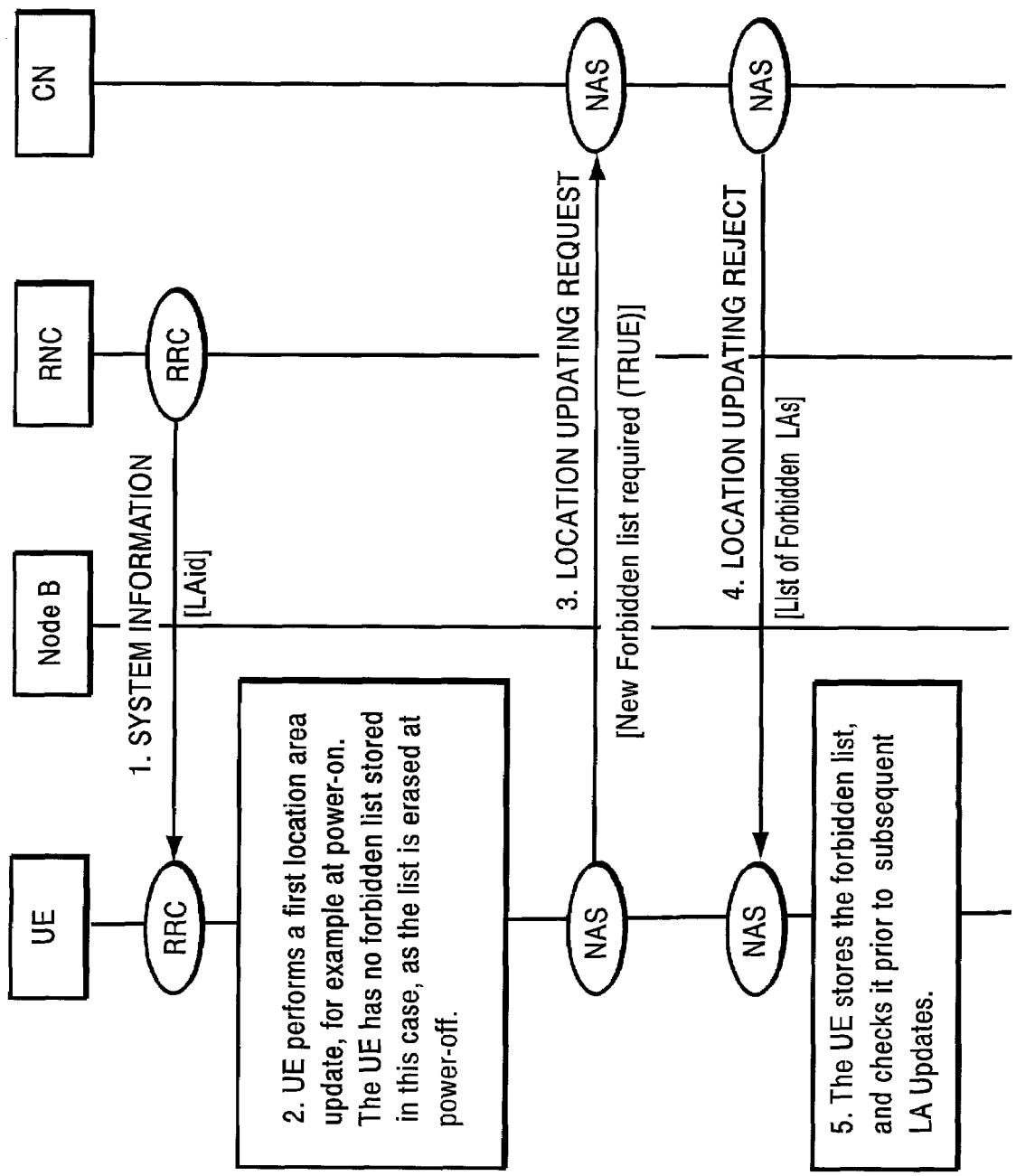
FIGS. 11 and 12 are diagrams illustrating unsuccessful location area updates where a forbidden list is provided to the mobile terminal.

FIG. 11 shows an example signaling diagram for an unsuccessful location area update in which a new forbidden list is sent to the mobile terminal. As before, when a mobile terminal powers on and begins a cell selection process, it reads the new cell's location area ID included in the broadcast system information. At this point, it is assumed that the mobile terminal does not have a forbidden list stored. One way for the mobile terminal to receive the current forbidden location area list is to request it in a location updating request message in which a forbidden list required bit is set to true or "1." In this case, the mobile terminal is requesting a location update for a location area forbidden for that mobile terminal. Accordingly, the core network rejects the request and sends a location updating reject message back to the mobile terminal which includes information relating to a current list of forbidden location areas for that mobile terminal. The mobile terminal stores the list of forbidden location areas and checks this list prior to attempting further location area updates. Specifically, the mobile terminal does not attempt a location area update in any of the forbidden location areas.

Figure 12:
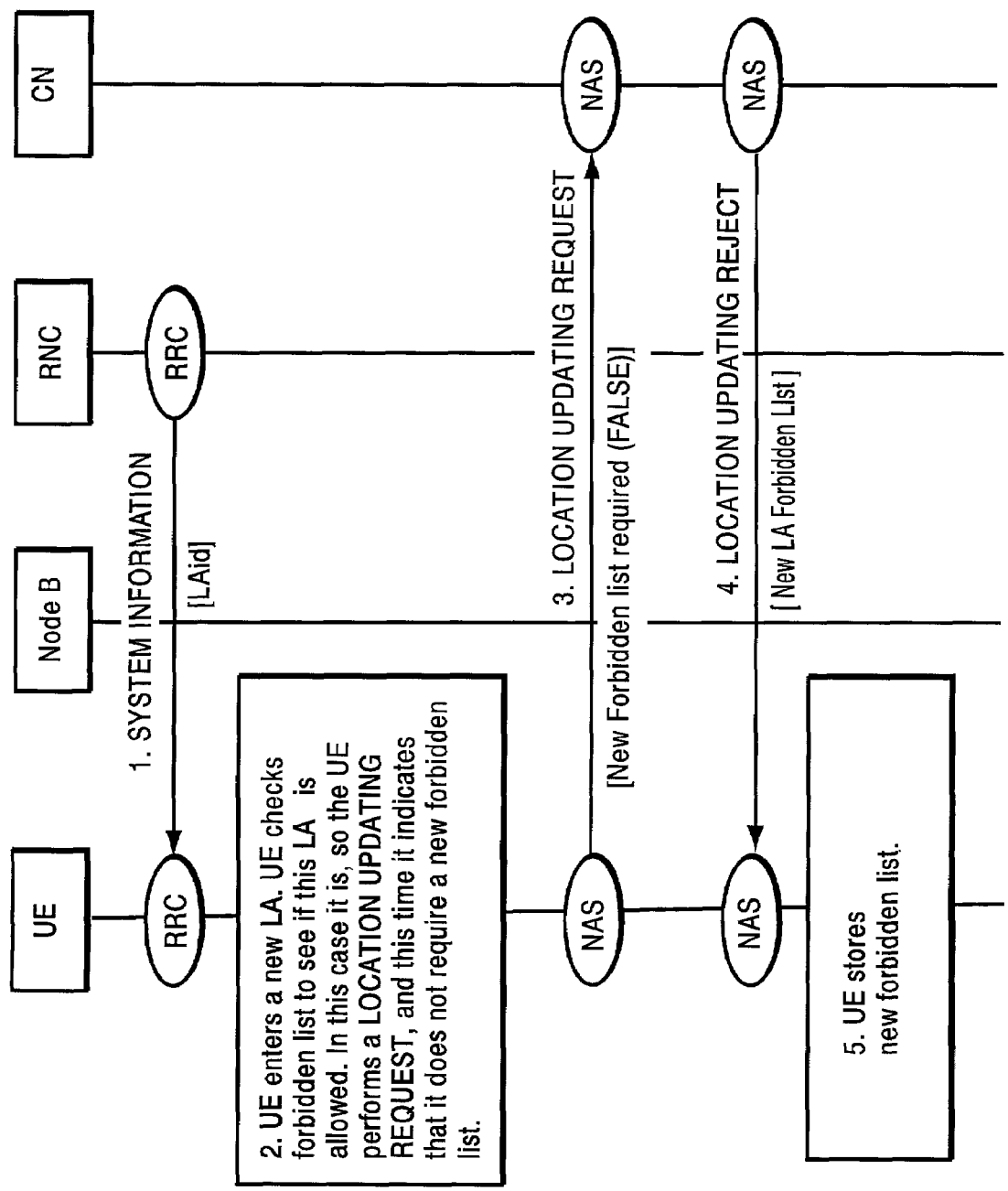

FIG. 12 shows an example signaling sequence for an unsuccessful location area update after the mobile terminal has powered-on and already received a forbidden list. When the mobile terminal considers selecting a new location area, it checks its forbidden location area list to see if this new location area is allowed. According to the list stored in the mobile terminal, it is an allowed location area. As a result, the mobile terminal sends a location updating request and indicates that it does not require a new forbidden location area list by setting the corresponding flag in the message to false or "0." Nevertheless, the core network rejects the location area update request because the forbidden list stored by the mobile terminal is out-of-date. For example, the network may have been recently reconfigured so that one of the shared network operators has changed the content of the forbidden list stored in the core network. Accordingly, new forbidden list information associated with this mobile terminal is selected by the core network based on the mobile terminal's IMSI identifier, and sent in the location updating reject message. The mobile terminal replaces the old list with a new forbidden list and uses it in subsequent location update decisions.

Figure 13A:
FIGS. 13A–13C illustrate formats of example location updating accept, location updating reject, and location updating request messages in accordance with the invention.
Figure 13B:
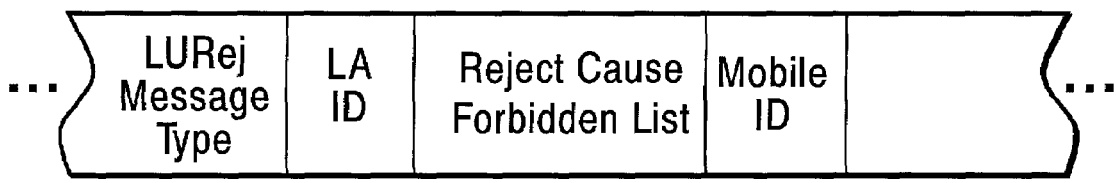
Figure 13C:
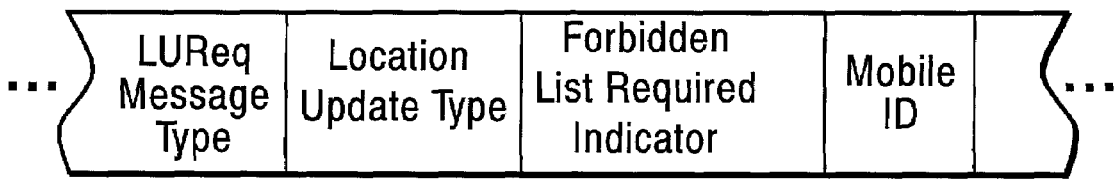

FIGS. 13A–13C illustrate non-limiting example message formats that may be used in accordance with the present invention. FIG. 13A illustrates a message format for a location updating accept message. Desirable message fields may include, for example, a location updating accept message type field, a location area identifier field, a mobile identifier field (e.g., the mobile's IMSI), and a location area forbidden list field. Of course, different or other fields may be included in this message in addition to the location area forbidden list field.

FIG. 13B illustrates a format for a location updating reject message sent by the network to the mobile terminal. The message may include a location updating reject message type field, a location area identifier field, a mobile identifier field, and a location area forbidden list contained in a reject cause field. Of course, different or other fields may be included in the message in addition to the location area forbidden list field.

FIG. 13C illustrates a format of certain fields in a location updating request message sent by the mobile terminal to the network. The message may include a location updating request message type field, a location update type field, a mobile identification field, and a forbidden list required indicator field. Of course, different or other fields may be included in this message in addition to the forbidden list required indicator. In a preferred example embodiment, the forbidden list required indicator field includes a single bit that is either set to "1" (true) if the forbidden list is required by the mobile terminal, or to a "0" (false) if the forbidden list is not required by the mobile terminal.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Accordingly, it is intended that the invention be limited only by the scope of the claims appended hereto.

What is claimed is:

1. A method implemented in a mobile radio terminal for reducing signaling associated with the mobile radio terminal selecting a new geographic coverage area, comprising:

in response to a location area update request message sent by the mobile radio terminal to a radio access network, receiving from the radio access network a location update accept message including information indicating a list of one or more geographic coverage areas from which the mobile radio terminal may not obtain service;

storing the list of one or more geographic coverage areas;

checking the received information when considering whether to request service from a new geographic coverage area including checking the stored list prior to performing a subsequent geographic coverage area update; and determining whether to select a geographic coverage area depending on the received information including determining whether to perform a location area update procedure based on the checked list.

2. The method in claim 1, further comprising:
receiving updated information from the radio access network.

3. The method in claim 1, wherein the radio access network is shared by first and second operators and the information indicates one or more geographic coverage areas belonging to one of the operators that does not provide service to the mobile radio terminal.

4. The method in claim 3, further comprising:
selecting a geographic coverage area belonging to the other of the operators.

5. The method in claim 1, wherein the geographic coverage area is a location area and the information includes a list of forbidden location areas for the mobile terminal, and wherein the mobile terminal does not perform a location area update for forbidden location areas on the forbidden location area list.

6. The method in claim 5, wherein the mobile terminal does not select cells in location areas that are on the forbidden location area list.

7. A method implemented in a cellular communications system including a radio access network for serving plural geographic coverage areas, comprising:

receiving a geographic coverage area update request message from a mobile radio terminal, and in response to the received geographic coverage area update request message, sending in a geographic coverage area update accept message to the mobile radio terminal information indicating a list of the geographic coverage areas from which the mobile radio terminal may not request service, wherein the mobile terminal uses the information to reduce signaling between the mobile terminal and the radio access network by not performing a geographic coverage area update procedure for a geographic coverage area included in the list.

8. The method in claim 7, wherein the mobile terminal uses the information to determine whether to select a geographic coverage area.

9. The method in claim 7, further comprising:
updating the information in a subsequent geographic coverage area update message sent to the mobile terminal.

10. The method in claim 7, wherein the radio access network is shared by first and second operators and the information indicates one or more geographic coverage areas belonging to one of the operators that does not provide service to the mobile radio terminal.

11. The method in claim 7, wherein the geographic coverage area is a location area, the method further comprising:

determining one or more groups identifying certain mobile terminals;

formulating a list of location areas corresponding to each of the groups; and in response to the message received from the mobile terminal, forwarding one of the lists of location areas to the mobile terminal depending upon the group to which the mobile terminal belongs.

12. The method in claim 11, wherein the determining, formulating, and forwarding are performed in a core network coupled to the radio access network.

13. The method in claim 11, wherein each group represents mobile terminals belonging to a network operator.

14. The method in claim 11, wherein each group represents mobile terminals belonging to a mobile subscriber group.

15. The method in claim 11, further comprising:
determining an identifier associated with the mobile terminal;

analyzing the mobile terminal identifier to determine the group to which the mobile terminal belongs; and sending the list of location areas corresponding to the determined group in response to the message received from the mobile terminal.

16. The method in claim 7, wherein the information is sent from a core network to the radio access network.

17. A method for use in a cellular radio communications system including a core network coupled to a radio access network communicating information with mobile radio terminals over a radio interface, comprising:

storing a list of forbidden location areas for a group of mobile terminals;

receiving a location area update request message sent from one of the mobile terminals in the group;

sending in a location area update accept message the list of forbidden location areas to the one mobile terminal;

the one mobile terminal receiving and storing the list of forbidden location areas; and the one mobile terminal checking the list of forbidden location areas and not performing a location area update operation for a location area that is on the list of forbidden location areas in order to reduce signaling between the mobile terminal and the radio access network.

18. The method in claim 17, wherein the one mobile terminal does not select a cell in a location area that is on the list of forbidden location areas.

19. The method in claim 17, wherein the radio access network is shared by first and second operators and the list of forbidden location areas indicates one or more location areas belonging to one of the operators that does not provide service to the mobile radio terminal.

20. The method in claim 17, wherein the list is sent in response to a first location update message sent by the one mobile terminal after the mobile terminal powers up.

21. Apparatus for use in a mobile radio terminal, comprising:

radio transceiving circuitry configured to receive from a radio access network information indicating a list of one or more geographic coverage areas from which the mobile radio terminal may not obtain service, and electronic circuitry configured to perform the following tasks:

check the stored list prior to determining whether to perform a geographic coverage area update, and determine not to perform a geographic coverage area update based on the checked list in order to reduce signaling between the mobile radio terminal and the radio access network, wherein the information is received in a location area update accept message in response to a first location area update request message sent by the mobile terminal to the radio access network.

22. Apparatus for use in a mobile radio terminal, comprising:

radio transceiving circuitry configured to receive from a radio access network information indicating a list of one or more geographic coverage areas from which the mobile radio terminal may not obtain service, and electronic circuitry configured to perform the following tasks:

check the stored list prior to determining whether to perform a geographic coverage area update, and determine not to perform a geographic coverage area update based on the checked list in order to reduce signaling between the mobile radio terminal and the radio access network, wherein the information is received in a location area update accept message in response to a location area update request message sent by the mobile terminal to the radio access network, and wherein the electronic circuitry is further configured to store the list of one or more geographic coverage areas, to check the received information when considering whether to request service from a new geographic coverage area, and to determine whether to select a geographic coverage area depending on the received information.

23. The apparatus in claim 21, wherein the radio access network is shared by first and second operators and the information indicates one or more geographic coverage areas belonging to one of the operators that does not provide service to the mobile radio terminal, and wherein the electronic circuitry is further configured to select a geographic coverage area belonging to the other of the operators.

24. The apparatus in claim 21, wherein the geographic coverage area is a location area and the information includes a list of forbidden location areas for the mobile terminal.

25. The apparatus in claim 24, wherein the electronic circuitry is further configured to not select a cell in a location area that is on the list of forbidden location areas.

26. The apparatus in claim 24, wherein the electronic circuitry is further configured to not perform a location area update procedure for a location area that is on the list of forbidden location areas.

27. Radio access network apparatus for use in a cellular communications system including a radio access network serving plural geographic coverage areas, comprising:

radio transceiving circuitry configured to receive a message from a mobile radio terminal, and data processing circuitry configured to provide information indicating a list of geographic coverage areas from which the mobile radio terminal may not request service, wherein the mobile radio terminal uses the information to reduce signaling between the mobile terminal and the radio access network by not performing a geographic coverage area update procedure for a geographic coverage area included in the list, wherein the data processing circuitry is configured to provide the information in a geographic coverage area update accept message in response to an initial geographic coverage area update request message sent by the mobile terminal.

28. The apparatus in claim 27, wherein the mobile terminal uses the information to determine whether to perform a location update procedure and whether to select a geographic coverage area.

29. The apparatus in claim 27, wherein the radio access network is shared by first and second operators and the information indicates one or more geographic coverage areas belonging to one of the operators that does not provide service to the mobile radio terminal.

30. The apparatus in claim 27, wherein the geographic coverage area is a location area and the data processing circuitry is configured to determine one or more groups identifying certain mobile terminals, formulate a list of location areas corresponding to each of the groups, and forward the list of location areas to a mobile terminal depending upon the group to which the mobile terminal belongs.

31. The apparatus in claim 30, wherein the electronic circuitry for performing the determining, formulating, and forwarding tasks is located in a core network coupled to the radio access network.

32. The apparatus in claim 30, wherein each group represents mobile terminals belonging to a network operator.

33. The apparatus in claim 30, wherein each group represents mobile terminals belonging to a mobile subscriber group.

34. The apparatus in claim 30, wherein the data processing circuitry is configured to determine an identifier associated with the mobile terminal, analyze the mobile terminal identifier to determine the group to which the mobile terminal belongs, and provide the list of location areas corresponding to the determined group in response to the message received from the mobile terminal.

* * * * *

UNITED STATES PATENT AND TRADEMARK OFFICE
CERTIFICATE OF CORRECTION

PATENT NO. : 7,181,212 B2 Page 1 of 1
APPLICATION NO. : 09/933133
DATED : February 20, 2007
INVENTOR(S) : Hogan et al.

It is certified that error appears in the above-identified patent and that said Letters Patent is hereby corrected as shown below:

In Fig. 7, Sheet 5 of 10, For Tag "36", delete "Circiuty" and insert -- Circuitry --, therefor.

In Fig. 8, Sheet 5 of 10, For Tag "54", delete "Circiuty" and insert -- Circuitry --, therefor.

In Column 1, Line 41, delete "Telecommnunications" and insert -- Telecommunications --, therefor.

In Column 4, Line 21, delete "deternunes" and insert -- determines --, therefor.

In Column 8, Line 4, delete "lub" and insert -- Iub --, therefor.

In Column 8, Line 11, delete "lur" and insert -- Iur --, therefor.

In Column 8, Line 16, delete "lub" and insert -- Iub --, therefor.

Signed and Sealed this

Eighth Day of April, 2008

JON W. DUDAS
*Director of the United States Patent and Trademark Office*